United States Patent
Tobias

(10) Patent No.: US 6,749,780 B2
(45) Date of Patent: Jun. 15, 2004

(54) PREFORM AND METHOD FOR MANUFACTURING A MULTI-LAYER BLOWN FINISH CONTAINER

(75) Inventor: John W. Tobias, Spartanburg, SC (US)

(73) Assignee: Graham Packaging Company, L.P., York, PA (US)

( * ) Notice: Subject to any disclaimer, the term of this patent is extended or adjusted under 35 U.S.C. 154(b) by 17 days.

(21) Appl. No.: 10/297,698

(22) PCT Filed: Jun. 19, 2001

(86) PCT No.: PCT/US01/19533

§ 371 (c)(1),
(2), (4) Date: Dec. 10, 2002

(87) PCT Pub. No.: WO02/00418

PCT Pub. Date: Jan. 3, 2002

(65) Prior Publication Data

US 2003/0211256 A1 Nov. 13, 2003

Related U.S. Application Data

(60) Provisional application No. 60/214,582, filed on Jun. 27, 2000.

(51) Int. Cl.[7] .......................... B29B 17/00; B29C 49/22; B32B 1/08
(52) U.S. Cl. .................... 264/37.31; 264/512; 264/513; 264/515; 264/161; 215/12.1; 215/37.9; 428/36.91
(58) Field of Search .............................. 264/37.31, 161, 264/512, 513, 515; 215/12.1, 37.9; 428/36.91

(56) References Cited

U.S. PATENT DOCUMENTS

| | | | |
|---|---|---|---|
| 4,496,064 A | 1/1985 | Beck et al. | 215/1 C |
| 4,526,821 A | 7/1985 | McHenry et al. | 428/35 |
| 4,535,901 A | 8/1985 | Okuddaira et al. | 215/1 C |
| 4,550,043 A | 10/1985 | Beck | 428/36 |
| 4,576,843 A | 3/1986 | Beck et al. | 428/35 |
| 4,618,515 A | 10/1986 | Collette et al. | 428/35 |
| 4,665,682 A | 5/1987 | Kerins et al. | 53/452 |
| 4,728,549 A | 3/1988 | Shimizu et al. | 428/35 |
| 4,818,575 A | 4/1989 | Hirata et al. | 428/36.7 |
| 4,980,100 A | * 12/1990 | Krishnakumar et al. | 264/400 |
| 5,092,474 A | 3/1992 | Leigner | 215/1 C |
| 5,261,544 A | 11/1993 | Weaver, Jr. | 215/1 C |
| D402,563 S | 12/1998 | Prevot et al. | D9/538 |
| D420,593 S | 2/2000 | Denner et al. | D9/520 |
| D423,936 S | 5/2000 | Smith et al. | D9/520 |
| 6,228,317 B1 | * 5/2001 | Smith et al. | 264/521 |
| 6,280,679 B1 | * 8/2001 | Rashid et al. | 264/512 |

* cited by examiner

*Primary Examiner*—Suzanne E. McDowell
(74) *Attorney, Agent, or Firm*—Howson and Howson

(57) ABSTRACT

A preform and method used to make a container which has a blown wide-mouth finish and a multilayer wall structure. The injection molded preform has a multi-layer container body forming portion, a mono-layer moil forming portion and a blown finish forming portion located between the container body forming portion and the moil forming portion. The preform is blown into an intermediate article consisting of a blown finish wide-mouth multi-layer container and a mono-layer moil portion which is severed from the intermediate article and recycled. The multilayer wall structure can include at least one layer of a gas barrier material, a cost-effective recycled material, or a material which strengthens and/or lightweights the container.

17 Claims, 3 Drawing Sheets

PREFORM AND METHOD FOR MANUFACTURING A MULTI-LAYER BLOWN FINISH CONTAINER

CROSS REFERENCE TO RELATED APPLICATIONS

This application is a 371 of PCT/US01/19533 which was filed on Jun. 19, 2001 and which claims the benefit of priority of U.S. Provisional Patent Application No. 60/214,582 filed on Jun. 27, 2000.

FIELD OF THE INVENTION

The present invention relates to wide mouth blow-molded plastic containers, and more particularly, the present invention relates to a preform and method for use in efficiently manufacturing multi-layer wide mouth blow-molded plastic jars suitable for hot-fill applications.

BACKGROUND OF THE INVENTION

In the manufacture of blow-molded plastic bottles for containing liquids, such as beverages, it is customary to utilize an injection-molded preform having an injection molded threaded finish which ultimately forms the threaded finish of the container blown from the preform. The preform may be injection molded from a variety of desirable plastic materials, such as polyethylene terephythalate (PET), and may include an encapsulated gas barrier layer, such as an ethylene vinyl alcohol copolymer (EVOH) which is highly impermeable to oxygen when dry. Examples of multi-layer containers and preforms are disclosed in U.S. Pat. No. 4,526,821 issued to McHenry et al.; U.S. Pat. No. 4,535,901 issued to Okudaira et al.; U.S. Pat. No. 4,728,549 issued to Shimizu et al.; and U.S. Pat. No. 4,550,043 issued to Beck.

Some containers, particularly those molded of PET, have been utilized in hot fill applications where the blown container is filled with a beverage heated to a temperature in excess of 180° F. (82° C.), capped immediately after filling, and allowed to cool to ambient temperatures. In such containers, vacuum absorption panels are typically provided in the body of the container to accommodate vacuum induced shrinkage resulting from cooling of the container contents. In such containers, the injection molded threaded finish undergoes a minimal amount of distortion during the hot fill process. An example of a hot-fillable, multi-layer container having an injection molded finish is provided by U.S. Pat. No. 4,818,575 issued to Hirata et al.

For quite some time, there has been a need in the marketplace for a so-called wide-mouth container for hot-fill applications. A wide mouth container enables the consumer to scoop-out viscous contents which are not readily flowable. Such examples of viscous products include applesauce, spaghetti sauce, relish, pickles, beets, baby foods, sauerkraut, jelly, mayonnaise, and salad dressings to name a few. Examples of wide-mouth plastic containers are disclosed in U.S. Pat. No. : 5,092,474 issued to Leigner; U.S. Pat. No. 5,261,544 issued to Weaver, Jr.; Pat. No. D.423,936 issued to Smith et al.; Pat. No. D.420,593 issued to Denner et al.; and Pat. No. D.402,563 issued to Prevot et al.

In the early 1980's, attempts were made to produce hot-fillable PET containers having blown wide mouth finishes. To this end, a preform with an injection molded finish was blow-molded to form an intermediate-article which included a blown container and a moil portion integrally extending from the blown threaded finish portion of the blown container. The injection molded finish is part of the moil portion which is severed from the intermediate article thereby leaving a finished wide-mouth container having a blown finish with external threads. This manufacturing technique and the resulting containers are disclosed in U.S. Pat. No. : 4,665,682 issued to Kerins et al.; U.S. Pat. No. 4,618,515 issued to Collette et al.; and U.S. Pat. Nos. 4,576,843 and 4,496,064 issued to Beck et al. The above referenced Kerins patent also discloses the use of a five layer wall structure consisting of three layers of PET and two encapsulated layers of a barrier material, SARAN.

There is a current need for a novel and improved hot-fillable wide mouth container which includes an embedded gas barrier layer and which is particularly suited for packaging viscous food products.

OBJECTS OF THE INVENTION

With the foregoing in mind, a primary object of the present invention is to provide a commercially satisfactory wide-mouth blow-molded container that has a multi-layer construction.

Another object of the present invention is to provide a preform and method which can be used to manufacture a multi-layer wide-mouth blow-molded plastic container and which form an intermediate article having a moil portion consisting essentially of a primary container material so that, after the moil portion is severed from the container, the moil portion can be readily and efficiently recycled.

Still another object of the present invention is to provide a multi-layer wide mouth blow-molded plastic container which has a blown finish that at least partially includes an encapsulated layer of a secondary material and that resists distortion resulting from hot-filling.

A further object of the present invention is to provide a method of manufacturing a multi-layer wide-mouth container which enables commercially acceptable hot fillable wide-mouth plastic containers to be produced by means of high speed manufacturing equipment in an economical manner that ensures consistent quality and performance.

SUMMARY OF THE INVENTION

More specifically, according to one aspect of the present invention, a method of making a multi-layer blow-molded plastic container having an externally-threaded wide-mouth finish for receiving a removable closure is provided. To this end, a tubular preform is provided having a container body forming portion, a moil forming portion and a blown finish forming portion. The container body forming portion includes a closed bottom end of the preform and has a multi-layer structure including at least one layer of a secondary material located between inner and outer layers of a primary container material. The moil forming portion includes an open top end of the preform and has a mono-layer structure consisting essentially of the primary container material so that it can be readily recycled. The blown finish forming portion is located between the container body forming portion and the moil forming portion. Preferably, the secondary material extends into the blown finish forming portion of the preform and terminates therein without extending into the moil forming portion of the preform.

The above referenced preform is preheated and then disposed into a mold cavity having a surface with a container body forming region, a blown finish forming region superadjacent the body forming region, and a moil forming region superadjacent the blown finish forming region. The preform is then distended against the surface of the mold cavity to form an intermediate container article including a multi-layer blow-molded plastic container having a blown externally-threaded wide-mouth finish and a moil extending upwardly from the blown finish. The moil is severed from the intermediate container article and is recycled post-manufacture but pre-consumer.

According to other aspects of the invention, a preform is provided having the above described structure and a multi-layer wide-mouth container is produced according to the above referenced process.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT AND METHOD

Figure 4:
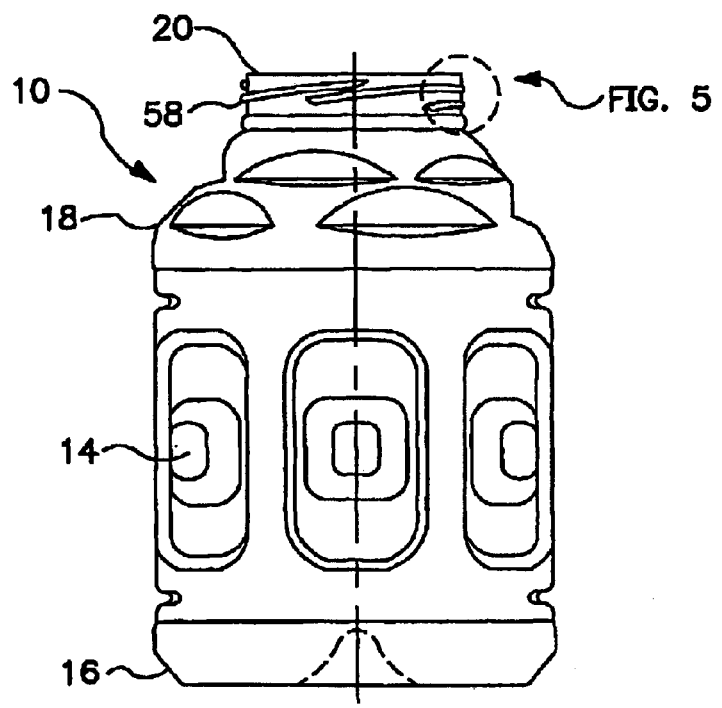
FIG. 4 is a side elevational view of the wide mouth container formed after the moil portion illustrated in FIG. 2 has been severed.
Figure 6:
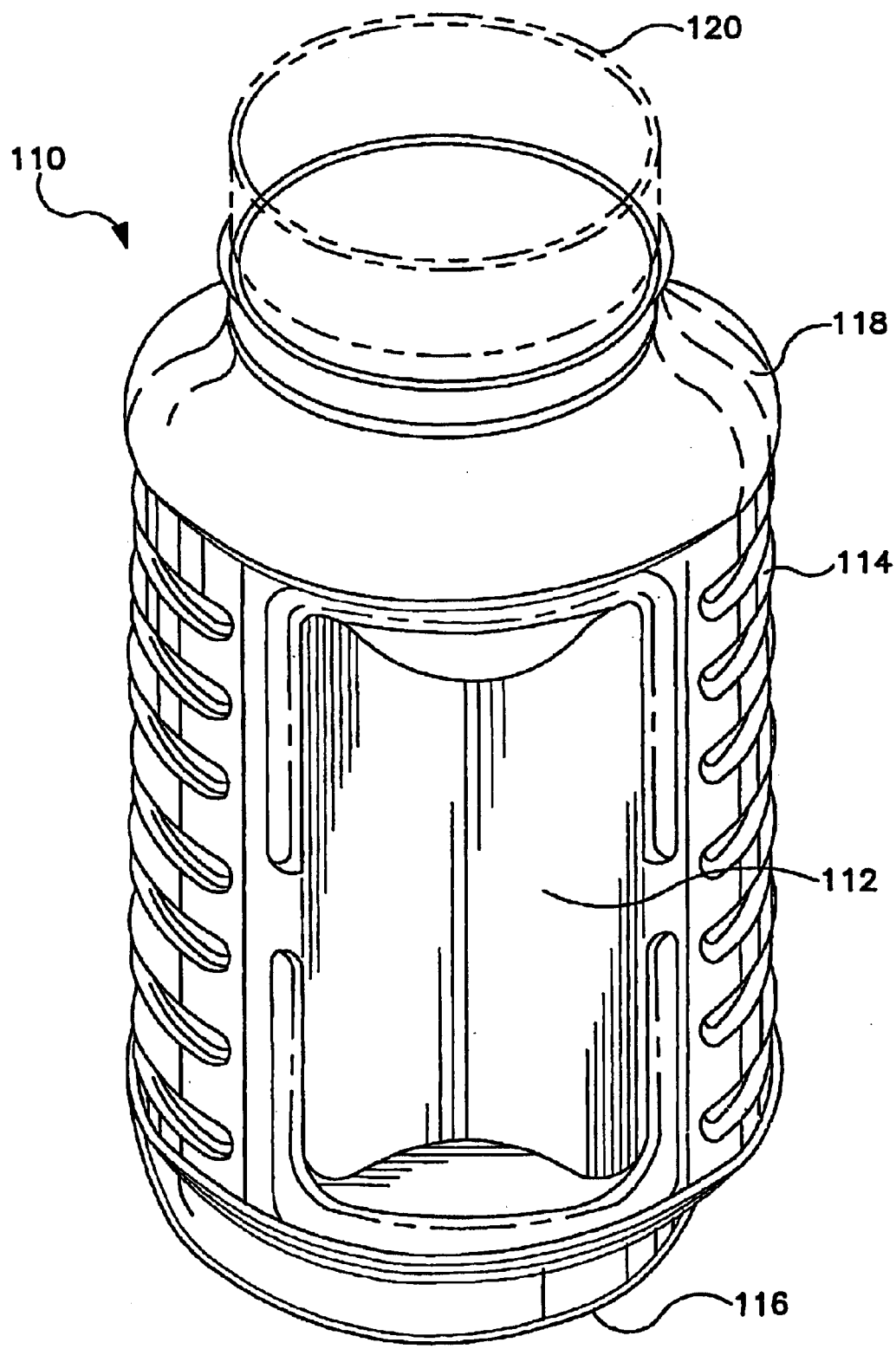
FIG. 6 is a side elevational view of an alternate wide-mouth container.

The purpose of the present invention is to provide a multi-layer, wide-mouth, blow-molded plastic container, or jar, such as illustrated in FIGS. 4 and 6. However, the present invention is not limited to any specific multi-layer, wide-mouth, plastic container structure. For instance, FIG. 4 illustrates a wide-mouth container 10 having a plurality of peripherally spaced flex panels 12 which enable the container 10 to be used in hot-fill applications, and FIG. 6 illustrates a wide-mouth container 110 having a pair of offset flex panels 112 which enable the container 110 to be used in hot-fill applications. Of course, the present invention is equally applicable to multi-layer wide-mouth container structures which do not include flex panels and which can be used in vacuum fill, cold fill, or any other type of processing method.

For purposes of the present invention, and as will be discussed in detail, important aspects of the subject containers are that they have a blown wide-mouth finish and a multilayer structure which includes one or more layers of a secondary container material substantially encapsulated within a primary container material. Thus, such a structure may include three, five or more alternating layers of primary and secondary container materials. Examples of secondary materials include re-cycled PET (PCR), PEN, EVOH, nylon and other gas barrier or recycled materials. An example of a primary material is PET.

The illustrated containers, 10 and 110, each have a wide mouth threaded finish, 20 and 120. For present purposes, a wide-mouth finish is defined as a finish having an outside diameter greater than about 2.0 inches, or 50 mm. Wide mouth finishes are preferred when the product contained is a viscous food product, such as applesauce or the like. In addition, the containers 10 and 110 each have a generally cylindrical container body, 14 and 114, including a base, 16 and 116, and a dome, 18 and 118. As stated, the container 10 has a plurality of peripherally spaced vacuum panels 12 provided in the body 14 for accommodating vacuum induced volumetric shrinkage and supporting a label, as well known in the art. The container 110 has a pair of flex panels 112 provided in the body 114 enabling the container 110 to be utilized in hot-fill processing.

Figure 5:
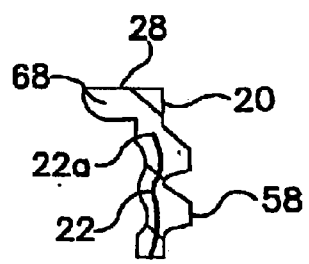
FIG. 5 is a greatly enlarged cross sectional view of the portion of FIG. 4 delineated as FIG. 5.

The containers 10 and 110 include an embedded layer of a secondary material. For instance, as illustrated in FIG. 5, a secondary material layer 22 is embedded within the walls of the container 10. The secondary material layer 22 is substantially encapsulated within the walls of the container by inner and outer layers, 24 and 26, of a primary container material. The primary container material may be, for instance, PET, and the secondary material may be, for instance, a gas barrier material (ie. EVOH or nylon), a recycled material (ie. PCR), or other materials (ie. PEN).

As best illustrated in FIG. 5, the secondary material layer 22 extends within the blown finish 20 but has a terminal end 22a which terminates below a top sealing surface 28 of the container 10. Thus, the secondary material layer 22 extends continuously through the container body 14, base 16, and at least partially through the blown finish 20. The only exception may be at the sprue 30 of the base 16 where the secondary material layer 22 may, or may not, be permitted to bleed through the outer layer 26 of the primary container material. In one contemplated embodiment, the secondary material layer 22 is provided as a single thin layer which forms no greater than about 20% of the thickness of the wall of the container.

As stated above, an important aspect of the container according to the present invention is that it is formed with a blown finish. This provides a significant cost savings relative to identically structured containers having injection molded wide-mouth finishes. However, a problem with wide-mouth plastic containers, particularly those that are formed by blow molding techniques, is the potential for undesirable distortion of the finish due to hot filling or other processing and due to subsequent storage and handling. Distortion is undesirable because a distorted threaded finish cannot function well in automatic cap applying equipment. Moreover, an undistorted finish is desirable to ensure seal integrity after the cap has been applied and tightened.

Figure 1:
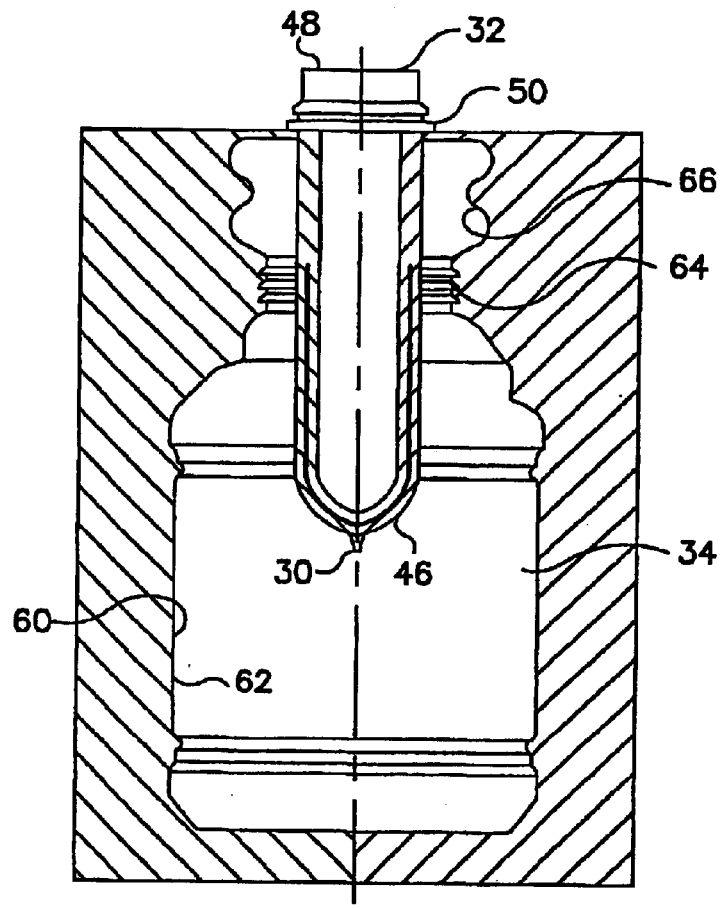
FIG. 1 is a schematic longitudinal view of a portion of a blow mold cavity illustrating a preform mounted in the cavity prior to blowing.
Figure 2:
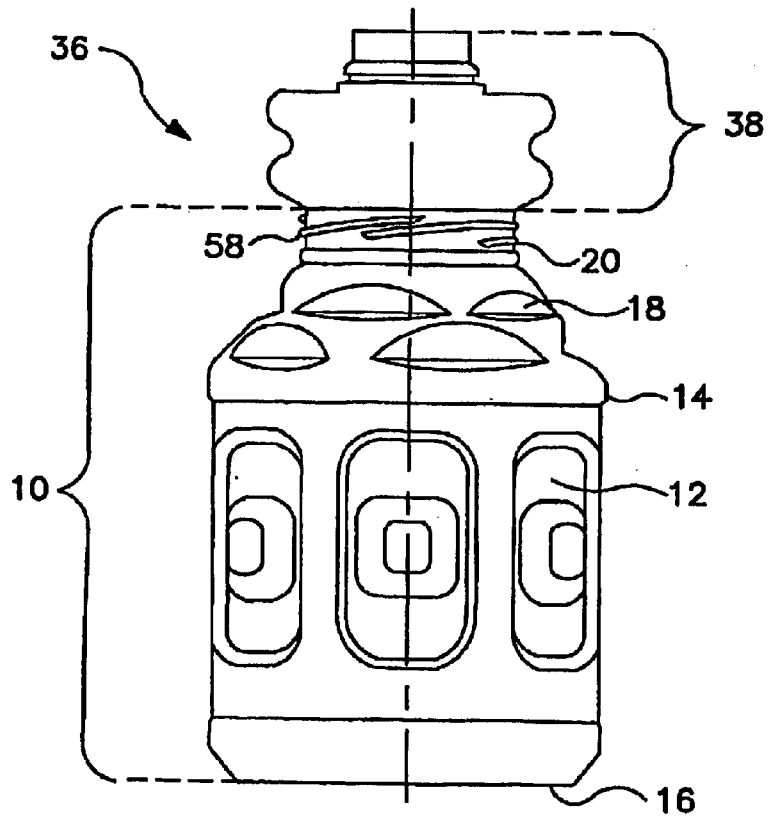
FIG. 2 is a side elevational view of an intermediate article having a moil formed when the preform shown in FIG. 1 is blown within the mold cavity.

A preform and a method for providing a distortion-resistant threaded finish on a multi-layer wide-mouth container is provided by the present invention. To this end, as illustrated in FIG. 1, a specially designed pre-heated preform 32 is provided in a mold cavity 34. The preform 32 blown in the mold cavity 34 forms an intermediate container article 36, such as illustrated in FIG. 2. The intermediate container article 36 has a moil portion 38 which is subsequently severed to ultimately provide the container 10 as illustrated in FIG. 4.

Figure 3:
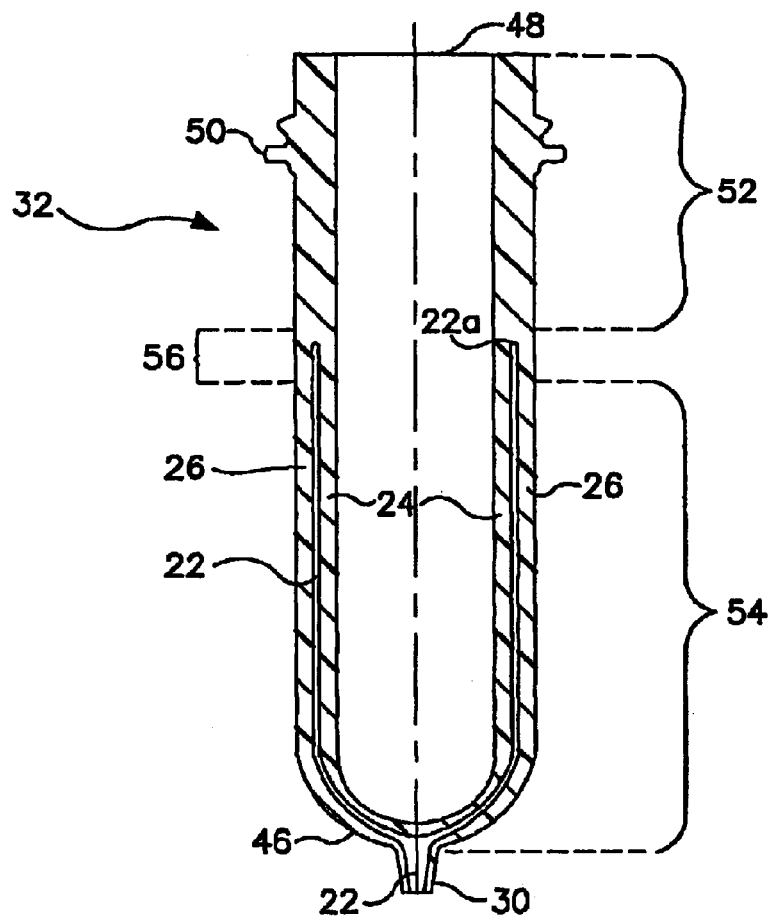
FIG. 3 is an enlarged longitudinal view of the preform illustrated in FIG. 1 showing the multi-layer structure of the preform.

As best illustrated in FIG. 3, the preform 32 has a tubular elongate body with a closed end 46 and an open end 48 surrounded by a peripheral flange 50 which supports the preform 32 in the mold cavity 34. The preform is injection molded and can be divided longitudinally into various regions corresponding to various regions of the intermediate container article 36 and ultimately, the container 10 itself.

A moil forming portion 52 is located adjacent the open end 48 of the preform 32. This portion of the preform 32, when blown, forms the moil 38 of the intermediate article 36. After being severed, the primary container material in the moil 38 can be recovered and recycled for use in making additional preforms. However, if the moil 38 contains secondary material, significant costs are associated with the separation of the secondary material from the primary container material during recycling. According to the present invention, the secondary material layer 22 in the preform 32 is intentionally formed such that it terminates below the moil forming portion 52 so that the moil 38 consists essentially of the primary container material and can be readily recycled.

A container body forming portion 54, which includes a base forming portion, is located adjacent the closed end 46 of the preform 32. As illustrated in FIG. 3, the secondary material layer 22 extends continuously throughout the container body forming portion 54 of the preform 32 except for where it bleeds through at the sprue 30. Thus, the preform 32, when blown, forms a multi-layer container body 14. For example, the multi-layer construction can be a three layer construction of PET/EVOH/PET; however, five or more layers can also be utilized and different primary and secondary materials can be utilized. By way of example, and not by way of limitation, the total thickness of the wall of the preform can be about 5 mm or 0.200 inches, and the secondary material layer can be centered in the wall and have a thickness of about 0.005 inches.

A blown finish forming portion 56 of the preform 32 extends between the moil forming portion 52 and the container body forming portion 54. The blown finish forming portion 56, when blown, forms the blown finish 20 of the container 10. The blown finish 20 includes a top sealing surface 28 and external threads 58. The top sealing surface 28 defines a plane in which the moil portion 38 interconnects with the blown finish 20 and where the moil portion 38 is severed from the container 10. As illustrated, the secondary material layer 22 extends into the blown finish forming portion 56 of the preform 32 but does not extend completely through the blown finish forming portion 56. Thus, as illustrated in FIG. 5, the secondary material layer 22 terminates a spaced distance below the top sealing surface 28 and is encapsulated within the primary container material adjacent the top sealing surface 28 of the container 10. Alternatively, the secondary material layer 22 can terminate below the blown finish portion 56 of the preform 32 so that the blown finish portion 56 is mono-layer and consists essentially of the primary container material. If additional gas barrier protection is desired in a mono-layer blown finish portion, the finish can be intentionally blown with a sufficient thickness to offset the lack of secondary material.

The mold cavity 34 has an interior mold surface 60 which corresponds to the overall outer configuration of the intermediate container article 36 below the preform flange 50. To this end, the mold cavity 34 has a surface 60 with a container body forming region 62, a blown finish forming region 64 superadjacent the body forming region 62, and a moil forming region 66 superadjacent the blown finish forming region 64. See FIG. 1.

When the preform 32 is blown in the mold cavity 34, it forms a threaded finish 20 having a wall of substantially uniform thickness. After the moil 38 is cut from the container 10, the upper end of the finish 20 has an inturned flange 68 as illustrated in FIG. 5. The inturned flange 68 reinforces the threaded finish 20 against ovalization and thereby enables it to resist distortion after hot-filling, both before and after capping. Moreover, the top sealing surface 28 of the inturned flange 68 is inclined at about a 5° angle to provide a smooth accurately-controlled, axially resiliently deformable surface for sealing against the inner surface of a closure (not shown).

In the method of the present invention, the above described preform 32 is pre-heated to a temperature, for instance, of about 120° C. and placed in the above described mold cavity 34. The preform 32 is distended, or blown, against the surface 60 of the mold cavity 34 to form the above described intermediate article 36. The moil portion 38 of the article 36 is severed from the container 10 and is recycled. The container 10 can be utilized in hot-fill or other applications without the occurrence of distortion. The secondary material layer 22 of the container 10 can function, for instance, to reduce the amount of gas which can pass through the wall in a given period so that an acceptable package shelf life can be provided for a wide variety of viscous food products. Alternatively, the secondary material layer 22 can be utilized as a cost-effective filler material to reduce material costs, or it can be utilized to increase the strength of the container, to lightweight the container, or to provide a container capable of being filled at higher hot-fill temperatures.

While a preferred method, preform and container has been described in detail, various modifications, alterations and changes may be made without departing from the spirit and scope of the present invention as defined in the appended claims.

I claim:
1. A method of making a multi-layer blow-molded plastic container (10, 110) having an externally-threaded wide-mouth finish (20, 120) for receiving a removable closure, comprising the steps of:
   obtaining a tubular preform (32) having a container body forming portion (54) which includes a closed bottom end (46) of said preform (32), a moil forming portion (52) which includes an open top end (48) of said preform (32), and a blown finish forming portion (56) located between said container body forming portion (54) and said moil forming portion (52), said body forming portion (54) of said preform (32) having a multi-layer structure including at least one layer (22) of a secondary material located between inner and outer layers (24, 26) of a primary container material, and said moil forming portion (52) of said preform (32) having a mono-layer structure consisting essentially of said primary container material;
   preheating said preform (32);
   disposing said preheated preform (32) into a mold cavity (34) having a surface (60) with a container body forming region (62), a blown finish forming region (64) superadjacent said body forming region (62), and a moil forming region (66) superadjacent said blown finish forming region (64);
   distending said preheated preform (32) against said surface (60) of said mold cavity (34) to form an intermediate container article (36) including a multi-layer blow-molded plastic container (10) having a externally-threaded wide-mouth finish (20) and a moil (38) extending upwardly from said blown finish (20); and
   severing said moil (38) from said intermediate container article (36) at a location that provides a severed moil (38) consisting essentially of said primary container material.

2. A method according to claim 1, wherein said secondary material extends substantially entirely through said body forming portion (54) and at least partially into said blown finish forming portion (56) of said preform (32), and wherein said secondary material terminates within said blown finish forming portion (56) below said moil forming portion (52).

3. A method according to claim 2, wherein said secondary material is a gas barrier material.

4. A method according to claim 2, wherein said secondary material is recycled material.

5. A method according to claim 2, wherein said secondary material is PEN.

6. A method according to claim 2, wherein said multi-layer structure consists of a three layer construction, and wherein said primary container material is PET.

7. A method according to claim 2, wherein said obtaining step includes injection molding of said preform (32).

8. A method according to claim 7, further comprising the step of recycling said moil (38) after said moil (38) has been severed from said intermediate container article (36), and utilizing said recycled moil (38) in the manufacture of more of said preforms (32).

9. A method according to claim 8, further comprising filling said container (10, 110) with a viscous food product and sealing said container (10, 110) with a closure.

10. A method according to claim 8, wherein said viscous food product is hot-filled into said container (10, 110) and wherein said container (10, 100) has a wide-mouth jar-like shape.

11. A multi-layer blow-molded plastic container (10, 110) having an externally-threaded wide-mouth finish (20, 120) for receiving a removable closure prepared by a process comprising the steps of:

obtaining a tubular preform (32) having a container body forming portion (54) which includes a closed bottom end (46) of said preform (32), a moil forming portion (52) which includes an open top end (48) of said preform (32), and a blown finish forming portion (56) located between said container body forming portion (54) and said moil forming portion (52), said body forming portion (54) of said preform (32) having a multi-layer structure including at least one layer (22) of a secondary material located between inner and outer layers (24, 26) of a primary container material, and said moil forming portion (52) of said preform (32) having a mono-layer structure consisting essentially of said primary container material;

preheating said preform (32);

disposing said preheated preform (32) into a mold cavity (34) having a surface (60) with a container body forming region (62), a blown finish forming region (64) superadjacent said body forming region (62), and a moil forming region (66) superadjacent said blown finish forming region (64);

distending said preheated preform (32) against said surface (60) of said mold cavity (34) to form an intermediate container article (36) including a multi-layer blow-molded plastic container (10) having a blown externally-threaded wide-mouth finish (20) and a moil (38) extending upwardly from said blown finish (20); and severing said moil (38) from said intermediate container article (36) at a location that provides a severed moil (38) consisting essentially of said primary container material;

said secondary material extending substantially entirely through said body forming portion (54) and at least partially into said blown finish forming portion (56) of said preform (32), and said secondary material terminating within said blown finish forming portion (56) below said moil forming portion (52);

said multi-layer structure consisting essentially of a three layer construction of an outermost layer (26) of PET, a core layer (22) of secondary material, and an innermost layer (24) of PET, said core layer (22) being selected from the group consisting of EVOH, nylon, PCR and PEN; and said container (10, 110) having at least one vacuum flex panel (12, 112).

12. An injection molded preform (32) for forming an intermediate article (36) which is used to form a blow-molded container (10, 110) having a wide-mouth blown finish (20, 120) with external threads and which includes a moil portion (38) extending integrally from said blown finish, said preform (32) comprising:

an injection-molded elongate tubular body having a closed bottom end (46), an open top end (48) with a peripheral flange (50), a container body forming portion (54) which includes said closed bottom end (46), a moil forming portion (52) which includes said open top end (48), and a wide-mouth blown finish forming portion (56) located between said container body forming portion (54) and said moil forming portion (52);

at least a portion of said body forming portion (54) having a multi-layer construction including at least one layer (22) of a secondary material located between inner and outer layers (24, 26) of a primary container material; and said moil forming portion (52) having a mono-layer construction consisting essentially of said primary container material.

13. An injection molded preform (32) according to claim 12, wherein said secondary material extends substantially entirely through said body forming portion (54) and into said blown finish forming portion (56) of said tubular body, and wherein said secondary material terminates within said blown finish forming portion (56) below said moil forming portion (52).

14. An injection molded preform (32) according to claim 13, wherein said secondary material is selected from the group consisting of a gas barrier material and a recycled material.

15. An injection molded preform (32) according to claim 13, wherein said secondary material is PEN.

16. An injection molded preform (32) according to claim 13, wherein said primary container material is PET.

17. An injection molded preform (32) according to claim 16, wherein said multi-layer construction consists of a three layer construction of an outermost layer (26) of PET, a core layer of gas barrier material, and an innermost layer (26) of PET.

* * * * *